INVENTORS.
JAMES T. CLANCEY
THOMAS J. REGAN
BY EDWARD J. WASP

ATTORNEY

United States Patent Office 3,394,811
Patented July 30, 1968

3,394,811
PROCESS FOR CONCENTRATING A SLURRY CONTAINING PARTICULATE MATERIAL
James T. Clancey and Thomas J. Regan, Pittsburgh, Pa., and Edward J. Wasp, San Rafael, Calif., assignors, by mesne assignments, to Consolidation Coal Company, a corporation of Delaware
Original application July 5, 1960, Ser. No. 40,785, now Patent No. 3,203,465, dated Aug. 31, 1965. Divided and this application Jan. 21, 1965, Ser. No. 426,808
5 Claims. (Cl. 210—73)

ABSTRACT OF THE DISCLOSURE

A method of increasing the solids concentration of a stabilized coal-water slurry. This method includes maintaining the slurry in a quiescent state in a decanting vessel for an extended period of time thereby permitting the slurry to separate into a water phase and a concentrated slurry phase. The concentrated slurry phase has an increase in solids concentration and retains flow characteristics that permit the concentrated slurry to be transported or pumped from the decanting vessel in conduits in a manner similar to a viscous liquid fuel. The water phase is separated from the concentrated slurry phase by decanting and the slurry is thereafter withdrawn from the decanting vessel in a manner similar to any viscous liquid fuel.

---

This application is a division of copending application Ser. No. 40,785, filed July 5, 1960, now U.S. Patent 3,203,465. The present invention relates to a process and apparatus for concentrating a slurry containing particulate material and more particularly to a process for increasing the concentration of a stabilized coal-water slurry.

In a copending U.S. application, Ser. No. 9,884, now abandoned, entitled, "Preparing Coal for Transportation by Pipeline," by C. B. Leffert et al., a method of preparing a stabilized slurry of coal and water is disclosed. This method consists of subjecting the coal particles of a slurry of particulate coal and water to external energy until the slurry is stabilized and exhibits plastic-like properties. The settling tendency of the coal particles in the slurry is substantially reduced after stabilization and is pumpable through a pipeline at much higher concentration by weight of coal per weight of slurry than untreated, unstable slurries. The stabilized slurry although plastic-like in appearance is fluid under flow conditions and is readily pumpable at these high concentrations. It has, in fact, been discovered that the pressure drop per unit length of pipe for these concentrated stabilized slurries is substantially the same as the pressure drop per unit length of pipe of unstable or untreated slurries having a much lower concentration of coal by weight per weight of slurry.

The present invention is concerned primarily with increasing the concentration of solids in the stabilized slurry by either a dewatering process or a drying process, or both.

As set forth in U.S. application Ser. No. 9,884, a stabilized slurry may be maintained under quiescent conditions for extended periods of time and the larger sized particles remain suspended in the slurry. In contrast to this, the larger sized particles of an unstable slurry settle out almost instantaneously when the unstable slurry is permitted to stand under quiescent conditions. The larger sized particles as they settle form a packed, highly immobile mass of solids whereas the stabilized slurry remains free flowing because there is no substantial particle size segregation. Throughout this specification the term "stabilized slurry" is employed to designate a slurry that retains larger sized coal particles in suspension under quiescent conditions.

The present invention contemplates increasing the solids concentration of a stabilized slurry by first permitting the slurry to remain in a quiescent state in a decanting vessel for an extended period of time, decanting a layer of clear water from the upper surface of the slurry, and withdrawing the slurry from the decanting vessel. The slurry withdrawn from the decanting vessel has an increased solids concentration and yet remains a free flowing slurry. The slurry of increased concentration has substantially the same distribution of various sized particles throughout. There is no appreciable segregation of particles relative to size in the slurry of increased concentration. The decanted slurry is pumped through a conduit to a drier, preferably of the fluid bed type, where the solids concentration of the slurry is further increased. If desired, substantially all the liquid can be removed from the slurry in the drier to provide particulate coal suitable for combustion in combustion apparatus designed to burn relatively dry coal.

In other instances, where facilities are available to burn a coal-water slurry, the slurry, after decantation, may be fed directly into the combustion apparatus; or a portion of the pipeline slurry may be fed into the drier to remove substantially all of the water and the dried particulate product may then be recombined with the slurry in predetermined amounts to provide a stabilized slurry of the desired solids concentration.

The present invention also contemplates increasing the concentration of the slurry in a fluidized bed drier. The drier includes a combustion chamber and a drying chamber. A fluidized bed of particulate material is maintained in the drying chamber by hot gases passsing upwardly therethrough from the combustion chamber. A grid member separates the two chambers and also serves to support the dense phase of fluid bed in the drying chamber. The drier is adapted to receive a slurry of coal and water directly and to utilize the fluidity of the slurry to improve the drying characteristics of the drier. For example, the slurry is utilized as a heat exchange medium to maintain the temperature of the grid within the drier below a predetermined temperature. This temperature limiting feature prevents the grid from overheating and agglomerating coal particles on the upper surface of the grid. In addition, the slurry, being a heat exchange medium, is heated to an elevated temperature before it is introduced into the drying chamber of the drier. The present invention also contemplates further circulation of the slurry in heat exchange relation with the hot gases in the combustion chamber of the drier to further preheat the slurry prior to its entry into the drying chamber.

It has been found that drying the slurry in a dense phase fluidized bed drier inherently classifies the particulate material in the slurry as to particle size. In the fluidization of the bed of particulate material, gas is passed upwardly through the bed of material at velocities sufficient to impart liquid-like properties to the bed of particulate material. The particles of the bed are separated from each other and the gas disperses itself uniformly throughout the bed. The bed exhibits an upper surface comparable to the surface of a boiling liquid. The portion of the bed below the defined surface is termed the "dense phase" of the fluidized bed. The large or coarser particles of the particulate material remain in the dense phase of the fluidized bed and may be withdrawn therefrom through a conduit below the surface of the bed. The finer particles of the particulate material become entrained in the gases passing upwardly through the dense phase of the fluidized bed.

These fine entrained particles above the defined surface of the bed are termed the "dilute phase" of the bed. The fine particles in the dilute phase are carried out of the drying chamber with the fluidizing gases and are subsequently separated therefrom.

In a fluidized bed drier, heated gases are passed upwardly through the bed of particulate material to serve both as a fluidizing medium and as a drying medium. It has been found that after fluidized drying the particles are divided into two particle size fractions. Substantially all the coarser particles remain in the dense phase and are withdrawn from below the surface of the bed. Substantially all the finer particles are entrained in the fluidizing gases and are carried out of the drying chamber by the fluidizing gases. The exact particle size at which the coarse and fine particles are separated, that is, the screen size through which the fine particles will pass but the coarse particles will not pass, is a function of the original particle size range, and the velocity of the fluidizing gases. The velocity of the fluidizing gases may be controlled to thereby control the size separation of the particles.

In the present invention, slurry containing particulate material having a spectrum of particle sizes is introduced directly into the fluidized bed of the fluidized bed drier. The fluidizing gases vaporize the liquid in the slurry, dry the particulate material and classify it according to size, as has been described above. Thus, the usual step of wet screening the slurry to classify it according to particle size prior to drying may be completely eliminated.

When introducing a slurry of particulate material into a fluidized bed dried it is desirable to have the highest solids concentration within the slurry compatible with pumpability or flowability of the slurry. The higher the solids concentration, the less heat will be required to vaporize the liquid. It is, therefore, desirable to increase the solids concentration of the slurry prior to being conducted to the drying chamber of the fluidized bed drier. Throughout the specification the terms "highly concentrated" or "slurry of increased solids concentration" are utilized to describe generically any process by which the percentage of solids by weight in the stabilized slurry is increased.

When a stabilized slurry, prepared according to the aforesaid copending patent application is utilized, it has been found that it is possible to increase the solids concentration of the slurry by permitting the slurry to remain in a quiescent state for an extended period of time. It has been observed that after an extended period of time, a clear water layer will form at the top of the container and may be removed by decantation or the like to increase the solids concentration of the slurry and provide a highly concentrated slurry. After the water has been removed and the solids concentration increased, the highly concentrated slurry remains a free flowing slurry. The highly concentrated slurry is fluid under flow conditions and is readily pumpable with conventional pumping apparatus. As will be discussed later in the specification, it was surprisingly discovered that there is no significant settling or segregation of the larger particles in the highly concentrated slurry nor is there any evidence of packing or interlocking of the particles within the highly concentrated slurry to reduce its fluidity or ability to flow. In fact, it has been found that the highly concentrated slurry easily flows by gravity from the decanting vessel.

It has been found that stabilized slurry of the aforesaid copending application may be dewatered in large decanting or separating tanks to increase the slurry solids concentration. The rate of separation of clear water is a function of time and after a predetermined time a state of equilibrium is attained where further separation does not take place. After the clear water is removed from the top of the concentrating vessel, the highly concentrated slurry may be transported by pumping through a conduit, and, if desired, may be introduced into a drier to be dried according to the hereinafter described method.

With the foregoing considerations in mind, it is a primary object of the present invention to increase the solids concentration of particulate material in a liquid-particulate material slurry.

It is another object of this invention to provide an improved process for the precombustion treatment of a coal-water slurry.

It is another object of this invention to provide an improved fluidized bed drier for a slurry containing particulate material.

It is another object of this invention to provide an improved method of drying and classifying a coal-water slurry having a spectrum of particle sizes.

It is a further object of this invention to increase the solids concentration of a stabilized coal-water slurry without substantially reducing its flow or pumping properties.

These and other objects achieved by the present invention will become apparent as this discussion proceeds in conjunction with the accompanying drawings, in which drawings.

Figure 1:
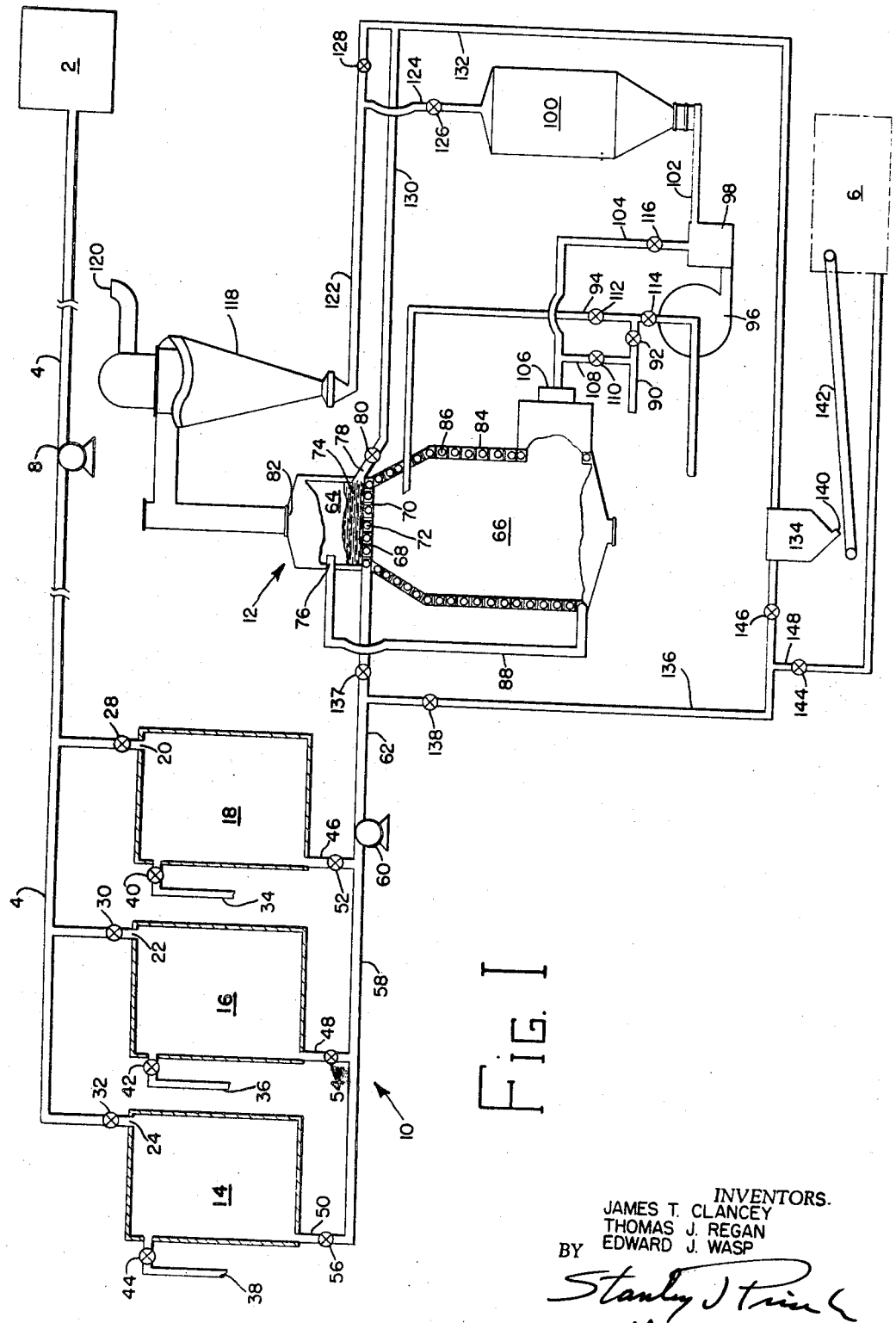
FIGURE 1 is a semi-schematic representation of the apparatus of the present invention.

Referring to the drawings and particularly to FIGURE 1, a pipeline transportation system is schematically shown with a preparation terminal 2, a pipeline 4 and a coal conversion terminal 6. A plurality of pumps 8 transport a stabilized coal-water slurry prepared in preparation terminal 2 through pipeline 4 to dewatering apparatus (later described) where the solids concentration of the stabilized slurry is increased. The dewatering apparatus is preferably located adjacent the coal conversion terminal 6 where the coal is converted as by burning, gasifying, carbonizing or the like.

The dewatering apparatus employed to increase the solids concentration of the stabilized slurry transported through pipeline 4 includes a decanting zone generally indicated by the numeral 10 and a drying zone generally indicated by the numeral 12. The decanting zone includes a plurality of storage or decanting vessels 14, 16 and 18 which may be of any desired dimension. The vessels 14, 16 and 18 have inlets 20, 22 and 24 through which slurry is introduced into the respective vessels. The inlets 20, 22 and 24 are connected to the pipeline 4 which is employed to transport stabilized coal-water slurry from the preparation terminal 2 spaced at a substantial distance therefrom to dewatering apparatus for further treatment and ultimate conversion of the coal contained within the slurry. Valves 28, 30 and 32 control the amount of slurry fed into the respective tanks. The storage vessels 14, 16 and 18 have water withdrawal outlets 34, 36 and 38 adjacent their upper portions which are employed to decant the clear water layer that has formed within the vessel after the slurry has been maintained therein for a predetermined period of time under quiescent conditions. Control valves 40, 42 and 44 are provided in the outlets 34, 36 and 38 respectively. Adjacent the lower portion of vessels 14, 16 and 18 there are outlets 46, 48 and 50 containing control valves 52, 54 and 56. Highly concentrated slurry, that is, the slurry from which clear water has been decanted, is withdrawn from the respective storage vessels 14, 16 and 18 through outlets 46, 48 and 50 respectively and conveyed by means of conduit 58 to pumping means 60.

The manner in which the clear water is decanted from the respective storage vessels 14, 16 and 18 will be described in detail in reference to FIGURES 2 and 3 later in the specification. The slurry which enters the pump 60 is at a higher solids concentration than the slurry which was transported through pipeline 4. The slurry of increased concentration remains a free flowing slurry and is fluid under flow conditions and readily pumpable by means of conventional pumping apparatus as diagrammatically shown in FIGURE 1. The energy required to pump the highly concentrated slurry may be greater than that required to pump a slurry having a lower solids concentration. The increase in pumping energy is of minor economic importance because the distance traversed is relatively short compared with the distance the slurry travels in the pipeline proper.

The highly concentrated slurry is transported through conduit 62 from pump 60 to a drier 12. The drier 12 illustrated in FIGURE 1 is a fluidized drier and has a drying chamber 64 and a combustion chamber 66. A bed supporting grid 68 supplies the two chambers and is disposed generally horizontally therebetween with a plurality of vertical passages 70 therethrough. The passages 70 are provided to permit passage of a fluidizing gas upwardly from the combustion chamber 66 through the grid 68 into the drying chamber 64. The passages 70 are of such size that the coarser particles of particulate material within the drying chamber 64 can not pass downwardly therethrough.

The grid 68 of the present invention is modified over the bed supporting grids of conventional driers to the extent that it has horizontal slurry conducting passageways 72 formed therein. The passageways 72 provide a means to conduct a cooling media across the grid 68. Slurry may be conducted continuously through passageways 72 within grid 68 to provide a heat exchange media for the grid 68. The highly concentrated slurry conveyed through conduit 62 is introduced into passageways 72 in the drier grid 68. When the drier 12 is in operation particulate material to be dried forms a fluidized bed within the drying chamber 64. The dense phase of the fluidized bed is indicated by the numeral 74. The drying chamber 64 has an inlet 76 which is disposed above the upper surface of the fluidized bed dense phase 74. In the present invention a preheated slurry of particulate material enters the drying chamber 64 through inlet 76 as will be described in detail later in this specification. The drying chamber 64 has a solids outlet 78 with a valve means 80 therein to control the rate that particulate material is withdrawn from the fluidized bed dense phase 74. A gas and vapor outlet 82 is provided at the top of the drying chamber 64. The fluidizing gases pass upwardly through the vertical passages 70 in grid 68 and fluidize the particulate material within the drying chamber 64. The hot gases vaporize the liquid in the material fed into drying chamber 64 and pass upwardly with the vaporized liquid through outlet 82. The entrained fine particles forming the dilute phase of the fluidized bed are also carried in the fluidizing gas and liquid vapor out of the drying chamber 64 through outlet 82. The combustion chamber 66 of the fluidized bed drier 12 is a generally cylindrical vessel having cylindrical side walls 84. The walls 84 of the present invention are modified to the extent that they have a slurry conducting conduit 86 formed therein in heat exchange relation with the walls 84. Slurry conduit 86 forms a continuous spiral-like passage for conducting slurry in heat exchange relation with the combustion chamber 66 and is connected to slurry conducting passageways 72 formed in grid 68 to provide a continuous slurry passage from conduit 62 through grid 68 and around the cylindrical wall 84 of combustion chamber 66. The slurry entering the passageways 72 in grid 68 through conduit 62 is circulated in heat exchange relation with the combustion chamber 66 through slurry conducting conduit 86 formed in the walls of combustion chamber 66. A conduit 88 connects the outlet of the spiral conduit 86 in combustion chamber 66 with the inlet 76 in drying chamber 64. After the slurry has been conducted in heat exchange relation with grid 68 and combustion chamber 66 it is conducted through conduit 88 to the drying chamber 64 where it forms a fluidized bed of material to be dried.

The combustion components of the fluidized bed drier 12 are of conventional construction. A pressurized air conduit 90 having control valve 92 therein is provided to conduct air under pressure from a source (not shown) into a heated gas conduit 94 through which heated gas from the combustion chamber 66 of drier 12 is conducted to a fan or pressurizing means 96. The pressurizing means 96 forces the air and heated gas through a fuel pulverizer 98 which pulverizes fine coal particles that are utilized to provide a fuel source for the drier 12. A fuel storage bin 100 retains a quantity of fuel which is fed therefrom through conduit 102 to pulverizer 98 as required. A conduit 104 conducts the pulverized fuel entrained in the heated gas and air from pulverizer 98 to a burner 106. Another conduit 108 having a valve 110 therein connects air conduit 90 with a fuel conduit 104. The valve 110 controls the amount of air mixed with the fuel in conduit 104 prior to its entering the burner 106. Valves 112, 114 and 116 control the rate of flow of heated gas, fuel and air. The mixture of fuel and air is ignited at the burner 106 and the heated gases which are the products of combustion are conducted upwardly through combustion chamber 66, grid 68 and drying chamber 64. The heated gases are the fluidizing medium for the fluidized bed and also provide the heat to vaporize the liquid in the material fed into the drying chamber 64.

A cyclone separator 118 is provided to separate the fine entrained particulate material which is carried out through outlet 82 from the combustion chamber 64. In conventional fashion, cyclone separator 118 separates the solid particles from the gases and liquid vapors and permits the gases and vapors to be vented through stack 120. Depending upon the application of the present system, the gases passing through stack 120 may be further treated if desired.

The fine particulate material is conducted from the separator 118 through a fine coal conduit 122. A conduit 124 having control valve 126 is provided to withdraw predetermined amounts of fine coal from conduit 122 and feed the same into storage bin 100. The conduit 122 also includes a control valve 128 provided to control the rate of flow within conduit 122. A coarse coal conduit 130 is connected to the drying chamber solids outlet 78 at one end and at the other end to a dry coal conduit 132. The rate that the solids are withdrawn from the dense phase of the fluidized bed 74 within the drying chamber 64 is controlled by means of valve 80.

As shown in FIGURE 1 the coal conveyed in conduits 122 and 130 is combined in conduit 132. In the embodiment disclosed, fine and coarse coal particles are utilized for the same purpose. However, if desired, the streams in conduits 122 and 130 can remain separate and be conveyed to different localities. The combined fine and coarse coal is conveyed through conduit 132 to a mixing vessel 134. A conduit 136 connects conduit 62 with the mixing vessel 134 so that a predetermined amount of slurry may by-pass the drier 16 and be mixed with dry product in mixing vessel 134. The amount of slurry conducted through conduit 136 is controlled by means of valve 138. With this arrangement the dry coal from the drier 12 and a portion of the slurry conveyed through conduit 136 are mixed together to produce a final product at the desired moisture content. The coal is withdrawn from the mixing vessel 134 through outlet 140 and is conveyed by means of a conveyor belt or the like 142 to a suitable location for ultimate use.

Several features of the present invention may be noted in FIGURE 1. The portion of the slurry to be dried in fluidized drier 12 is conducted first through the passageway 72 in heat exchange relation with the grid 68, thence through conduit 86 in heat exchange relation with the combustion chamber 66 and thence directly into the drying chamber 64 where it is fluidized and a predetermined amount of liquid is removed therefrom. By passing first through the passageways 72 in the grid 68 the slurry maintains the temperature of the grid below a predetermined temperature and at the same time the temperature of the slurry is increased. In this manner the grid 68 is maintained at a reduced temperature to thereby minimize agglomeration of the particulate material being dried on the upper surface of the grid 68. After passing through passageways 72 the slurry is conducted through conduits 86 in heat exchange relation with the combustion chamber 66. This passage of slurry therethrough further increases the slurry temperature without a substantial heat loss in the combustion chamber 66. The preheated slurry is then introduced directly into the drying chamber 64 where a predetermined amount of liquid is removed from the slurry by the fluidizing gases. So far as is known, this introduction of particulate material into a fluidized bed as a stabilized slurry is a novel concept. It is contemplated that the slurry may be so introduced into other types of drying systems, for example, introducing a stabilized coal-water slurry directly into a fluidized low temperature carbonization system.

It will be appreciated that maintaining the temperature of the grid below a predetermined temperature and simultaneously raising the temperature of the slurry and subsequently further heating the slurry by the heat exchange relation with the combustion chamber 66 are cumulative operations, and under specified circumstances one or the other forms of slurry circulation may be eliminated. That is, in some applications it may be desirable to cool the grid and then conduct the slurry directly into the drying chamber 64. In other applications it may be desirable to eliminate passing the slurry through the passageways 72 in grid 68 and only conduct the slurry in heat exchange relation with the combustion chamber 66 before conducting the slurry into the drying chamber 64.

As a specific example of the operation of the present invention the system will be considered when concentrating a stabilized coal-water slurry entering from pipeline 4. The stabilized coal-water slurry having, for example, between about 50 to about 60% weight coal per weight of slurry enters the various decanting vessels 14, 16 and 18. The slurry is permitted to remain in a quiescent state in the vessels 14, 16 and 18 for a predetermined time until a predetermined layer of clear water forms in the upper portion of the vessel. The water is removed therefrom through outlets 34, 36 and 38 and the slurry having an increased solids concentration to between about 63–70% coal by weight slurry is withdrawn from the tanks 14, 16 and 18 through conduit 58. The highly concentrated slurry, that is the slurry having a solids concentration between 63–70% coal by weight slurry, remains a free flowing slurry and has many of the desirable properties of the stabilized 50–60% slurry entering the tanks 14, 16 and 18 from pipeline 4. The highly concentrated slurry is at a temperature of about 50–70° F. as it enters the pump 60. The highly concentrated slurry is transported through conduit 62 by means of pump 60 at a temperature of about 50–70° F. As the slurry is conducted through the passageways 72 in the grid 68 the temperature of the slurry is increased. The slurry is then conducted through conduit 86 in heat exchange relation with the combustion chamber 66 and exits therefrom through conduit 88 at a temperature of about 170–200° F. when it enters the drying chamber 64 of the drier. The liquid in the slurry is vaporized in the drying chamber 64 by the hot gas entering through passages 70 in grid 68. The particulate coal is withdrawn from the drying chamber 64 through outlet 78 at a moisture of about 5% and then is conveyed through conduit 130 to conduit 132. The fine coal particles entrained in the gases passing through outlet 82 are separated therefrom in cyclone 118 and are withdrawn through conduit 122 and contain a moisture of about 1 or 2%. The coarse and fine coal particles are combined in conduit 132 and conveyed to mixer 134. The coal in mixer 134 is combined with a predetermined amount of highly concentrated slurry conveyed through conduit 136 to provide a final coal product having a desired moisture content of about 11–12% water by weight.

Where the coal conversion terminal 6 is adapted to handle a stabilized slurry having a solids concentration of between about 60 to 70% coal by weight, the slurry having the desired concentration is withdrawn from respective tanks 14, 16 and 18 and introduced into conduit 58. Valves 137 and 146 are closed in respective conduits 62 and 136 so that the slurry enters conduit 148 and is transported therethrough to coal conversion terminal 6. Valve 144 regulates flow through conduit 148.

It is also within the scope of this invention to feed stabilized slurry directly from pipeline 62 to drier 12 and thereby bypass decanting vessels 14, 16 and 18 respectively and mix the product from the drier 12 with pipeline slurry to obtain the desired moisture content of the material. It is also within the scope of this invention to bypass the drier 12 with highly concentrated slurry from the decanting vessels 14, 16 and 18, and feed the highly concentrated slurry to combustion facilities designed to burn stabilized coal-water slurries having between about 60 to 70% solids by weight.

Figure 2:
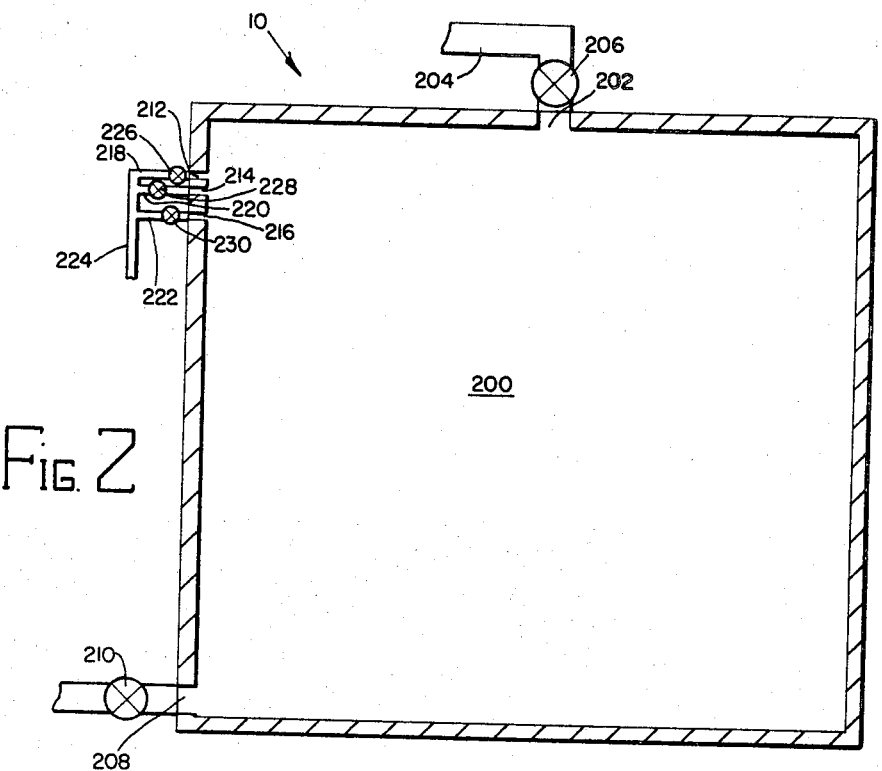
FIGURE 2 is a semi-schematic representation of a concentrating vessel for increasing solids concentration of a stabilized coal-water slurry.
Figure 3:
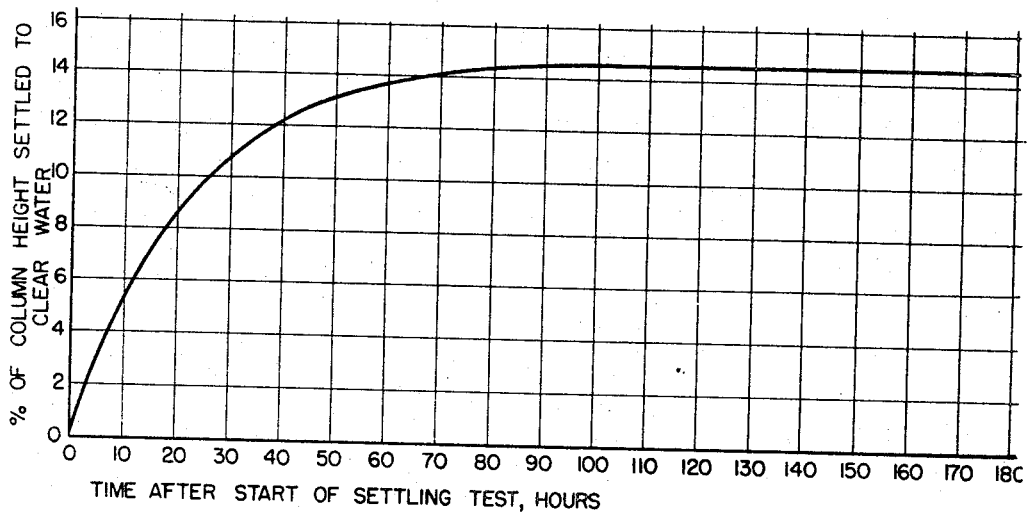
FIGURE 3 is a graphical representation of the time required to separate a given amount of water from a stabilized coal-water slurry.

Referring to FIGURE 2 there is illustrated schematically a decanting vessel similar to decanting vessels 14, 16 and 18 illustrated in FIGURE 1. The decanting vessel has an inlet 202 to which is connected a conduit 204. The conduit 204 is in turn connected to pipeline 4 (not shown). A valve 206 is positioned in conduit 204 and is employed to control the pipeline slurry feed into the tank 200 and close conduit 204 when tank 200 is filled. The tank 200 has a slurry withdrawal outlet 208 with a control valve 210 therein and a plurality of water outlets 212, 214 and 216. The water outlets 212, 214 and 216 are positioned at predetermined distances from the top of tank 200. For example, the outlet 212 is approximately 8% of the tank height from the top of the tank. The outlet 214 is located at a distance equal to 10% of the tank height from the top of the tank and outlet 216 is positioned at a point 14% of the tank height from the top of the tank. The outlets 212, 214 and 216 have conduits 218, 220 and 222 connected thereto at one end and at the other end to a common water conduit 224. Valves 226, 228 and 230 are positioned in respective conduits 218, 220 and 222 to control the flow through the respective conduits.

The method of increasing the solids concentration by means of decantation in tank 200 is as follows. The tank 200 is filled with pipeline slurry at, for example, about 60% solids concentration. Valves 206, 210, 226, 228 and 230 are closed. The tank is permitted to stand under quiescent conditions for a predetermined length of time depending on the solids concentration of the slurry desired to be withdrawn through conduit 208. FIGURE 3 illustrates the length of time required for the settling of clear water at the levels of outlets 212, 214 and 216 in tank 200. For example, if it is desired to remove 8% of the tank height of clear water the slurry within tank 200 is permitted to remain in a quiescent condition for about 17½ hours. The slurry then withdrawn from the bottom of the tank will have an increased solids concentration to about 65% solids. If it is desired to withdraw 10% of the tank height as clear water the slurry is permitted to remain under quiescent conditions for about 26 hours. If it is desired to increase the solids concentration to about 70% or to remove about 14% of the tank height as clear water, the slurry is permitted to remain under quiescent conditions for a period in excess of 70 hours. It will be noted from FIGURE 3 that after approximately 80 hours a state of equilibrium will be attained wherein further separation of clear water from stabilized slurry does not take place.

Surprisingly, it has ben determined that the size distribution of the coal particles which have a spectrum of sizes ranging from particles retained on an 8 mesh Tyler standard screen to particles which pass through a 325 mesh Tyler standard screen remain substantially the same after the solids concentration of slurry has been increased from 60% to about 70%.

The following example illustrates the stability of the slurry and the almost complete absence of size segregation of particles within the vessel during the decanting operation. Stabilized coal slurry having a weight concentration of about 60% solids had 4.8% of the solids of a size that was retained on an 8 mesh Tyler standard screen. The fraction having a size between 8 and 14 mesh comprised 20% of the solids. After remaining under quiescent conditions in a vertical column for a period of nine days, the concentration of the slurry, after decanting the water layer, was approximately 71% solids. A sample of the slurry taken at about two inches from the bottom of the vessel had about 5% solids that were retained on an 8 mesh Tyler standard screen; about 20% of the solids in the slurry sample were of a size fraction that passed through an 8 mesh Tyler standard screen and were retained on a 14 mesh Tyler standard screen. Thus, the size distribution before and after decantation appeared to be substantially the same indicating little if any size segregation during the time the slurry remained in a quiescent state. Also, after the nine day period the bottom tap, which is the equivalent of outlet 208, FIGURE 2, was opened and the slurry flowed freely therefrom, illustrating that the slurry of increased concentration remains free flowing.

Another example illustrating the ability to increase the concentration of a stabilized slurry having an increased water content is as follows: Stabilized slurry having a solids concentration of about 50% coal was introduced into a vertical column and permitted to remain under quiescent conditions for about 175 hours. A layer of clear water was removed from the top of the column and the remaining slurry had a solids concentration of about 62% coal by weight. There was no appreciable segregation of particles according to size. The slurry of increased concentration in about 62% by weight coal retained its free flowing property and was easily withdrawn from the vertical column.

Although the specific examples of a pipeline slurry having an initial concentration of between 50 and 60% solids by weight are set forth, and the concentration of the pipeline slurry was increased to between about 63% and 70% solids, it should be understood that it is within the scope of this invention to provide a method for increasing the solids concentration of a stabilized coal-water slurry having other solids concentration.

According to the provisions of the patent statutes, we have explained the principle, preferred construction, and mode of operation of our invention and have illustrated and described what we now consider to represent its best embodiment. However, we desire to have it understood that, within the scope of the appended claims, the invention may be practiced otherwise than as specifically illustrated and described.

We claim:

1. The method of increasing the solids concentration of a stabilized coal-water slurry from a transport pipeline having a concentration of between about 50% and 60% by weight coal particles, about 20% by weight of said coal particles having a size spectrum capable of passing through an 8 mesh Tyler Standard Screen and being retained on a 14 mesh Tyler Standard Screen comprising introducing said stabilized slurry into a vessel with said size spectrum of coal particles substantially uniformly distributed in said stabilized slurry, maintaining said slurry under quiescent conditions in said vessel until said slurry separates into a clear water phase and a slurry phase, separating said water phase from said remaining slurry phase to thereby obtain a highly concentrated slurry having an increased solids concentration and said size spectrum substantially uniformly distributed in said highly concentrated slurry, withdrawing said highly concentrated slurry from said vessel and introducing said highly concentrated slurry into a conduit.

2. The method of increasing the solids concentration of a stabilized coal-water slurry from a transport pipeline having a solids concentration of about 60% coal particles by weight and about 20% by weight of said coal particles having a size spectrum capable of passing through an 8 mesh Tyler Standard Screen and being retained on a 14 mesh Tyler Standard Screen, said method comprising introducing said stabilized slurry into a vessel with said size spectrum of coal particles substantially uniformly distributed in said stabilized slurry, maintaining said slurry under quiescent conditions in said vessel for at least about 18 hours, decanting a layer of substantially clear water from said vessel, said remaining coal-water slurry having a solids concentration of between 65–70% coal particles by weight and said size spectrum substantially uniformly distributed in said remaining coal-water slurry, withdrawing said remaining coal-water slurry from said vessel and introducing said remaining slurry into a conduit.

3. The method of increasing the solids concentration of a stabilized coal-water slurry from a transport pipeline from about 60% coal by weight to about 70% coal by weight which comprises introducing said stabilized slurry at about 60% coal by weight into a vessel, said stabilized slurry having about 20% by weight of coal particles with a size spectrum capable of passing through an 8 mesh Tyler Standard Screen and being retained on a 14 mesh Tyler Standard Screen, said size spectrum of coal particles substantially uniformly distributed in said stabilized slurry, maintaining said slurry under quiescent conditions in said vessel for about 80–90 hours, and withdrawing a layer of clear water from said vessel, said remaining slurry having a solids concentration of about 70% coal by weight, and said size spectrum substantially uniformly distributed in said remaining slurry, withdrawing said remaining slurry from said vessel and introducing said remaining slurry into a conduit.

4. The method of increasing the solids concentration of a stabilized slurry from a transport pipeline from about 60% coal by weight to about 70% coal by weight, said slurry consisting essentially of coal particles and water, said coal particles having a size spectrum in which about 5% by weight of said coal particles have a size capable of being retained on an 8 mesh Tyler Standard Screen and about 20% of said coal particles have a size capable of passing through an 8 mesh Tyler Standard Screen, said size spectrum of coal particles being substantially uniformly distributed in said slurry, said method comprising introducing said stabilized slurry at about 60% coal by weight into a vessel, maintaining said slurry under quiescent conditions in said vessel for about 80–90 hours, and withdrawing a layer of substantially clear water from said vessel, said remaining slurry having a solids concentration of about 70% coal by weight, said particulate coal in said remaining slurry adjacent the bottom of said vessel having about 5% by weight of coal particles having a size capable of being retained on an 8 mesh Tyler Standard Screen and about 20% coal with a size capable of passing through an 8 mesh Tyler Standard Screen and being retained on a 14 mesh Tyler Standard Screen, withdrawing said slurry having a concentration of about 70% coal by weight from said vessel and introducing said slurry into a conduit.

5. The method of increasing the solids concentration of a stabilized coal-water slurry from a transport pipeline including a size spectrum of coal particles capable of pssing through an 8 mesh Tyler Standard Screen and being retained on a 14 mesh Tyler Standard Screen to reduce the percent by weight of water in said slurry transported by said pipeline from distant locations comprising the steps of, diverting the flow from said pipeline into a first concentrating vessel to substantially fill said first vessel, thereafter diverting the flow from said pipeline to a second concentrating vessel, said size spectrum of coal particles being substantially uniformly distributed in said slurry in both of said concentrating vessels, maintaining said slurry in said first vessel under quiescent conditions for a predetermined period of time, thereafter withdrawing substantially clear water from the top of said first vessel, thereafter withdrawing a slurry of increased solids concentration from the bottom of said first vessel by permitting it to flow therefrom into a conduit until said first vessel is substantially empty, said slurry of increased solids concentration having said size spectrum of coal particles substantially uniformly distributed therein, thereafter again diverting flow from said pipeline to said first vessel, maintaining said slurry under quiescent conditions in said second vessel for a predetermined period of time, thereafter withdrawing substantially clear water from the top of said second vessel, and withdrawing a slurry of increased concentration from the bottom of said second vessel by permitting it to flow therefrom into a conduit, said slurry of increased solids concentration having said size spectrum of coal particles substantially uniformly distributed therethrough.

References Cited

UNITED STATES PATENTS

| | | | |
|---|---|---|---|
| 1,986,897 | 1/1935 | Shaw | 210—83 X |
| 2,069,024 | 1/1937 | Vohmann et al. | 210—519 X |
| 2,963,157 | 12/1960 | Kuss et al. | 210—83 |

FOREIGN PATENTS 14,341    7/1893    Great Britain.

REUBEN FRIEDMAN, *Primary Examiner.*

J. ADEE, *Assistant Examiner.*